(12) United States Patent
Regier

(10) Patent No.: US 11,672,205 B2
(45) Date of Patent: Jun. 13, 2023

(54) TWINE TENSION SENSOR ARRANGEMENT

(71) Applicant: AGCO Corporation, Duluth, GA (US)

(72) Inventor: Bernard Dean Regier, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 29 days.

(21) Appl. No.: 17/365,056

(22) Filed: Jul. 1, 2021

(65) Prior Publication Data

US 2022/0000034 A1    Jan. 6, 2022

Related U.S. Application Data

(60) Provisional application No. 63/046,802, filed on Jul. 1, 2020.

(51) Int. Cl.
*A01F 15/14* (2006.01)
*A01F 15/08* (2006.01)

(52) U.S. Cl.
CPC ........ *A01F 15/0858* (2013.01); *A01F 15/145* (2013.01)

(58) Field of Classification Search
CPC ......... B65B 13/22; B65B 13/26; B65B 13/32; A01F 15/14; A01F 15/145; A01F 15/0858; A01D 59/00; A01D 59/04
See application file for complete search history.

(56) References Cited

U.S. PATENT DOCUMENTS

| 8,495,956 B1 | 7/2013 | Demulder et al. |
| 2004/0134360 A1 | 7/2004 | Rotole |
| 2006/0043138 A1 | 3/2006 | Aniel et al. |

FOREIGN PATENT DOCUMENTS

| DE | 34 08 149 A1 | 12/1984 | |
| DE | 289 917 A5 | 5/1991 | |
| DE | 19536964 A1 * | 4/1997 | ............. B65B 13/22 |
| EP | 0 857 414 A1 | 8/1998 | |
| EP | 2206650 A1 * | 7/2010 | ........... B65B 13/186 |
| EP | 3 294 633 A1 | 3/2018 | |
| FR | 2547481 A * | 12/1984 | ............. A01D 59/04 |
| GB | 2141664 A | 1/1985 | |
| GB | 2424850 A | 10/2006 | |
| WO | 83/00598 A1 | 3/1983 | |

OTHER PUBLICATIONS

English translation of EP 2206650A1 (4 pages) (Year: 2022).*
English translation of FR 2547481A1 (6 pages) (Year: 2022).*
European Patent Office, Search Report for related European Application No. EP 21 16 1862, dated Sep. 6, 2021.
UK Intellectual Property Office, Search Report for related UK Application No. 2010535.9, dated Jan. 11, 2021.

* cited by examiner

*Primary Examiner* — Jimmy T Nguyen

(57) ABSTRACT

A twine tensioner arrangement for a baler including a pair of rollers, each of the rollers being rotatable about a shaft and having circumferential lobes, at least one of the shafts being mounted on a displaceable armature, displacement measurement apparatus to measure the displacement of the displaceable armature and a signalling apparatus to generate a signal if the displacement of the displaceable armature exceeds a predetermined value. This enables monitoring of the tension in a strand of twine entering the twine tensioner arrangement and when the tension exceeds a predetermined value, allows action to be taken to avoid a mistie or damage to the baler components.

3 Claims, 3 Drawing Sheets

TWINE TENSION SENSOR ARRANGEMENT

CROSS-REFERENCE TO RELATED APPLICATIONS

This application claims the benefit of the filing date of U.S. Provisional Patent Application 63/046,802, filed Jul. 1, 2020, the entire disclosure of each of which is incorporated herein by reference.

FIELD OF THE INVENTION

The present invention relates to a mechanism for use in tying loops of twine about rectangular bales, and to a baler incorporating such a mechanism.

BACKGROUND

Rectangular bales are able to maintain their shape by means of a series of parallel extending twine loops, provided lengthwise around the bales. Current large square balers are equipped with a plurality of pivotally mounted, upwardly biased twine tensioner arms each associated with a plurality of knotter assemblies to maintain proper tension on the twine to ensure each knotter assembly performs properly. The twine is drawn from suitable twine boxes. If the twine tensioner arm fails to maintain proper tension on the twine, the twine can be pulled out of the knotter assembly and a mistie occurs. A number of factors affect the tension on the twine. Sometimes twine gets tangled in the twine box which makes it difficult or impossible for the baler to make knots. In extreme situations baler components may become damaged as a result. This is clearly a problem.

It is further a problem that an operator of the baler will not know there is a problem until the knot has been missed or damage to baler components has occurred.

It is an advantage of the present invention that it seeks to address these problems.

SUMMARY OF THE INVENTION

According to a first aspect of the present invention, a twine tensioner arrangement for a baler comprises a pair of rollers, each of the rollers being rotatable about a shaft and having circumferential lobes engaging each other in a meshing arrangement, at least one of the shafts being mounted on a displaceable armature, displacement measurement apparatus to measure the displacement of the displaceable armature and a signalling apparatus to generate a signal if the displacement of the displaceable armature exceeds a predetermined value.

This has as an advantage that a tension in a strand of twine entering the twine tensioner arrangement can be monitored and action taken to avoid a mistie or damage to the baler components.

Preferably the signalling apparatus generates the signal if the displacement of the armature exceeds a predetermined value for a predetermined period of time.

This has as an advantage that the signalling apparatus does not generate a signal where a brief increase in twine tension may be present, for example in the event of a momentary spike in twine tension required to work out a "natural memory" near tangle condition which works itself out as a strand of twine flows through the twine tensioner arrangement or generate a signal, for example, where passage of a knot joining two balls of twine will cause displacement of the displaceable armature without there being an increase in twine tension.

Preferably the signalling apparatus further comprises a control unit in communication with the displacement measurement apparatus and a user terminal, the control unit being adapted to receive signals from the displacement measurement apparatus, determine whether the signals from the displacement measurement apparatus represent displacement of the displaceable armature in excess of a predetermined value and if the signals from the displacement measurement apparatus represent displacement of the displaceable armature in excess of a predetermined value to generate a signal to the user terminal.

Alternatively or additionally, if the signals from the displacement measurement apparatus represent displacement of the displaceable armature in excess of a predetermined value the control unit additionally generates a signal causing operation of the baler to cease.

According to a second aspect of the invention, in a combination comprising an agricultural vehicle and a baler towed by the agricultural vehicle, the baler comprising a plurality of knotters, each knotter having a twine tensioner arrangement comprising a pair of rollers, each roller being rotatable about a shaft and having circumferential lobes, at least one of the shafts being displaceable, and displacement measurement apparatus to generate a displacement signal representative of a displacement of the at least one shaft, the combination further comprising a user terminal associated with the agricultural vehicle, a control unit and a memory in communication with the control unit, the control unit being configured to receive a plurality of signals including the displacement signals representative of the displacement of the at least one shaft in each twine tensioner arrangement and to compare the displacement signals against a predetermined set of values stored in the memory to determine whether an error condition exists and in the event of an error condition the control unit being configured to generate and send a signal to the user terminal to a cause an indication of the error condition to be generated by the user terminal.

Preferably, each of the displaceable shafts is mounted on a displaceable armature.

Alternatively or additionally, if the signals from the displacement measurement apparatus represent displacement of at least one displaceable shaft in excess of a predetermined value the control unit can also generate a signal causing operation of the baler to cease.

Preferably the indication of the error condition to be generated by the user terminal is a visual and/or an audible indication.

According to a third aspect of the invention, a computer implemented method comprises the steps of a control unit receiving a plurality of signals, the signals representing a displacement of at least one shaft in each twine tensioner arrangement according to the first aspect of the invention, the control unit being configured to receive a plurality of signals including the displacement signals representative of the displacement of the at least one shaft in each twine tensioner arrangement and to compare the displacement signals against a predetermined set of values stored in the memory to determine whether an error condition exists and in the event of an error condition the control unit being configured to generate and send a signal to a user terminal to a cause an indication of the error condition to be generated by the user terminal.

Preferably, if the signals from the displacement measurement apparatus represent displacement of the at least one shaft in excess of a predetermined value the control unit can also generate a signal causing operation of the baler to cease.

According to a fourth aspect of the present invention, a computer readable program comprises instructions that cause one or more processors to implement the method of the third aspect of the invention.

BRIEF DESCRIPTION OF THE DRAWINGS

The invention will now be described, by way of example only, with reference to the accompanying drawings, in which.

DETAILED DESCRIPTION OF SPECIFIC EMBODIMENTS

Figure 1:
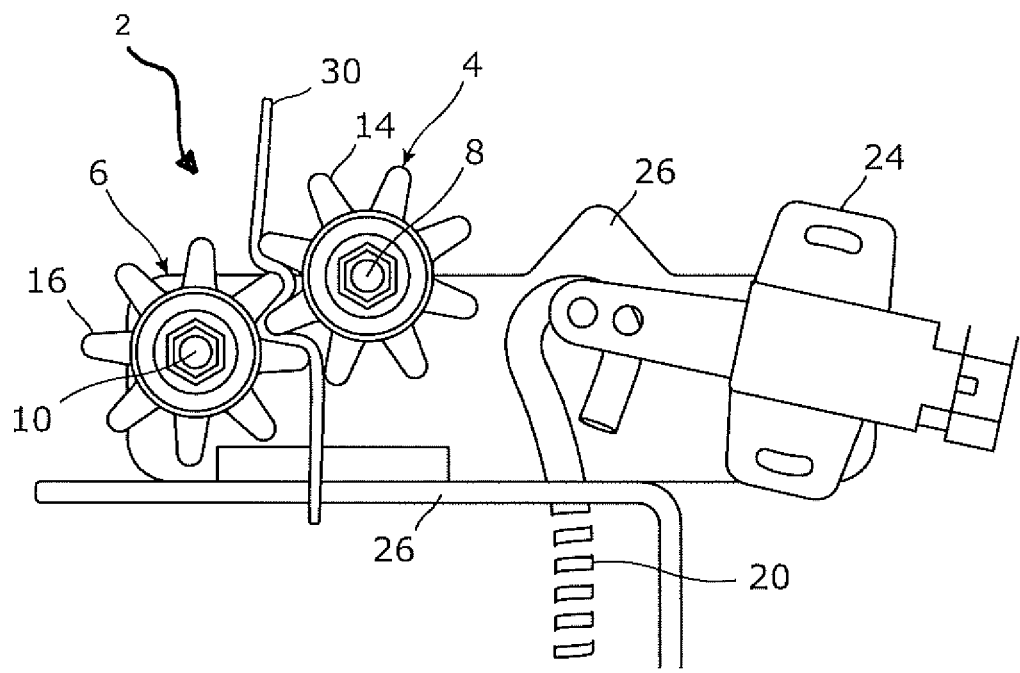
FIG. 1 shows a twine tensioner assembly in accordance with the present invention in which the elements of the assembly are in a first working configuration.

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

A baler 1 towed by an agricultural vehicle 3 is provided with a plurality of knotter assemblies 5. In use, in order to provide twine to each knotter assembly 5, a strand of twine 30 is drawn from a supply roll provided in a twine box located to the side of the baler 1 through a plurality of twine guides provided in side plates of the baler 1 and through a final twine guide associated with a twine tensioner assembly 2 before entering the twine tensioner assembly 2. Each knotter assembly 5 is provided with its own associated twine tensioner assembly 2. The twine 30 then passes from the twine tensioner assembly 2 to a tensioner arm of the associated knotter assembly 5.

Figure 2:
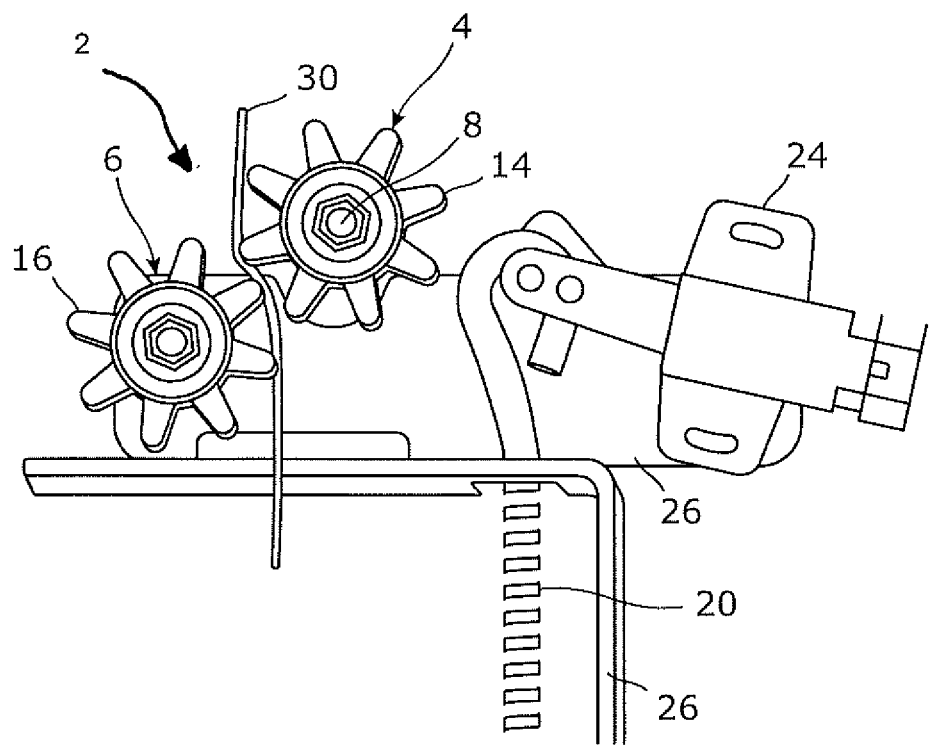
FIG. 2 shows the twine tensioner assembly of FIG. 1 in which the elements of the assembly are in a second erroneous configuration.
Figure 3:
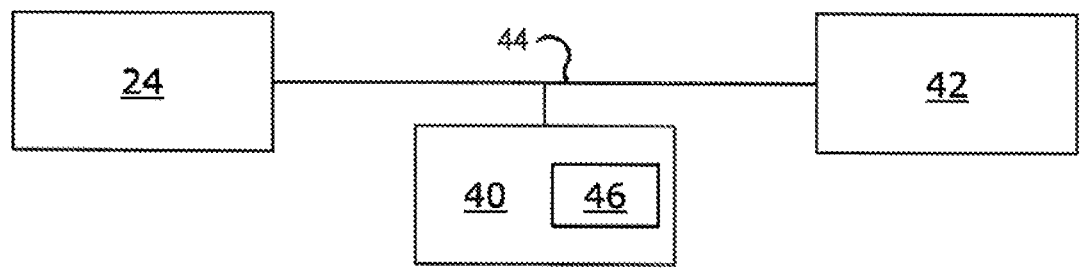
FIG. 3 shows a schematic view of elements of a baler for use in the present invention.

Referring to FIGS. 1 and 2, each twine tensioner assembly 2 includes a twine tensioner or gripper including upper and lower rollers 4 and 6, respectively. Each of the rollers 4,6 is adapted to rotate about a central shaft 8,10 and is provided with circumferential ridges, ribs or lobes 14,16. In the illustrated embodiment the central shaft 8 of the upper roller 4 is offset vertically and horizontally with respect to the central shaft 10 of the lower roller 6. It will be understood that other arrangements of the upper and lower rollers are possible.

In FIG. 1, the ribs or lobes 16 of the lower roller 6 are in a meshed arrangement with ribs or lobes 14 of the upper roller 4. The rollers 4 and 6 are biased together so as to maintain a tension in a length of twine being pulled through a nip of the meshed rollers 4, 6.

The rollers 4 and 6 may be biased together in any suitable manner.

Conveniently, a spring assembly 20 is used to bias the rollers 4, 6 together. For example, the central shaft 8 of the upper roller 4 may be supported on a spring biased element, such as a spring biased armature.

When a strand of twine 30 is flowing freely into the twine tensioner assembly 2, the tension in the strand of twine 30 is low and the strand of twine 30 is easily deformed between the lobes 14,16 of the rollers 4,6 (as in FIG. 1).

However, if (as shown in FIG. 2) the strand of twine 30 becomes snagged, knotted or otherwise fails to flow freely into the twine tensioner assembly 2, the tension in the strand of twine 30 increases such that the strand of twine 30 is deformed significantly less by the roller lobes 14, 16 and the tension causes the upper roller 4 to be displaced against the action of the spring assembly 20, for example by the armature being displaced around a pivot point (not shown).

This displacement may be measured, for example by suitable measuring device capable of generating a measurement signal, for example a potentiometer 24 provided on a frame 26 of the twine tensioner assembly 2.

The measurement signal is communicated to an electronic control unit 40. The electronic control unit 40 is in communication with a user terminal 42. The user terminal 40 is conveniently located in the drivers cab of an agricultural vehicle 3 towing the baler 1.

Conveniently communication occurs by way of a suitable data communication network 44 such as one compliant with the ISOBUS standard (a network in conformance to ISO 11783).

The control unit 40 may conveniently comprise a single processor located on the agricultural vehicle 3 towing the baler 1 or its functions may be split between a processor located on the agricultural vehicle and one or more additional processors located on the baler 1, the additional processor(s) being in electronic communication with the first processor.

The control unit 40 is also able to access a suitable memory 46. The memory 46 may take any suitable form and is in electronic communication with the control unit 40. The memory 46 is adapted to store, in any suitable manner such as a database or look up table, reference values relating to the measurement signal.

Figure 4:
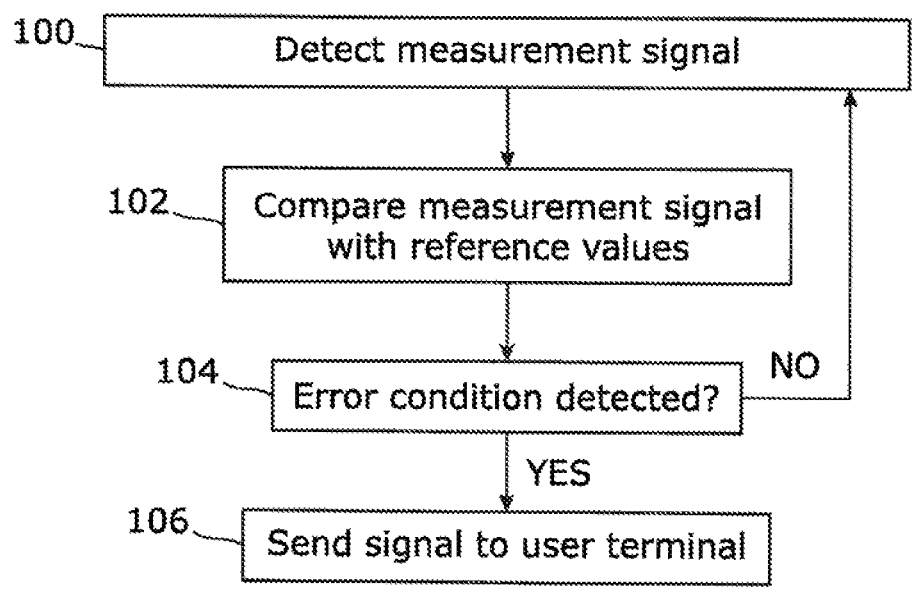
FIG. 4 shows a flow diagram Illustrating an example control method for the present Invention.
Figure 5:
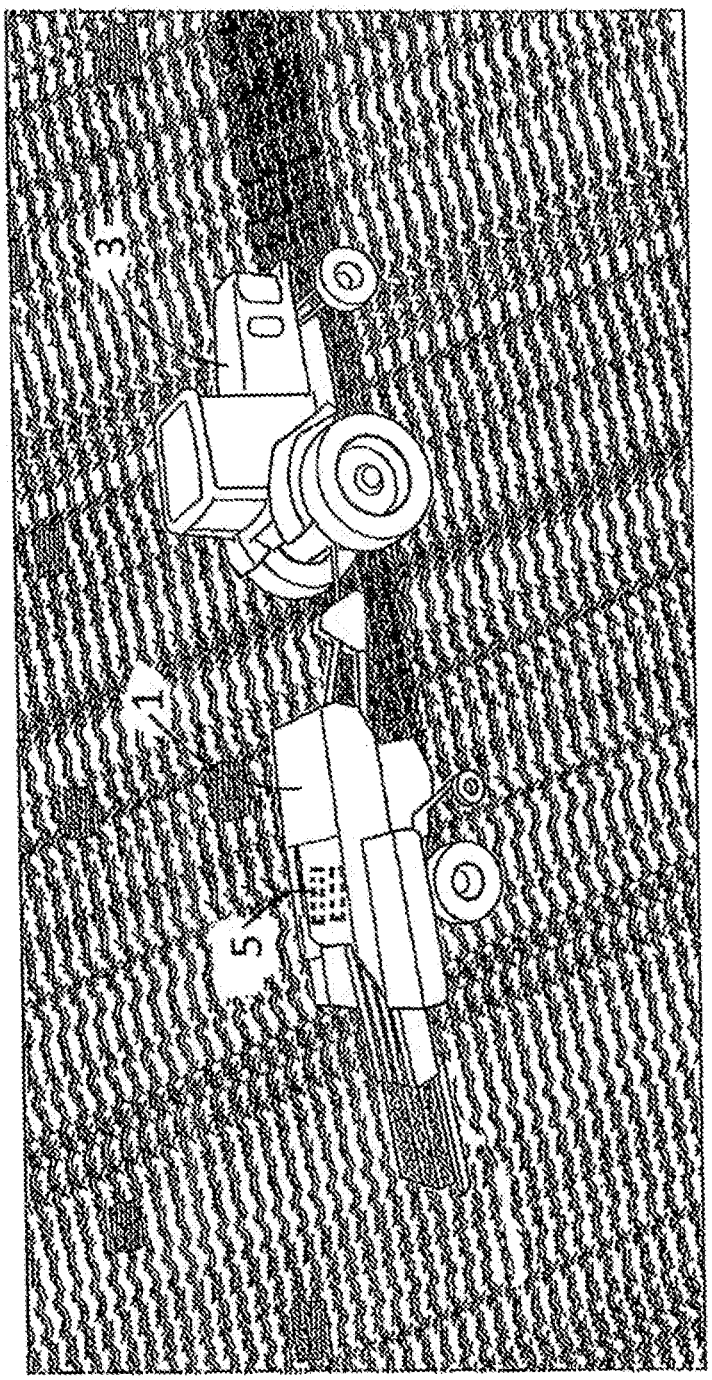
FIG. 5 shows an agricultural vehicle towing a baler that uses the twine tensioner assemblies of FIG. 1.

In operation, the control unit receives measurement signals from the measuring device, in the illustrated embodiment, the potentiometer (step 100, FIG. 4). The measurement signals are compared to the reference values in the memory (step 102). The control unit determines if an error condition is present (step 104). Such an error condition may correspond to a measurement signal in excess of a predetermined value or a series of measurement signals exceeding a predetermined value over a predetermined time interval. In the event of an error condition being determined, a signal is sent by the control unit 40 to the user terminal to alert an operator of the baler of the existence of an error condition (step 106). In the absence of an error condition being determined no signal is sent.

In a preferred embodiment, the control unit 40 also generates a signal to cause the operation of the baler 1 to cease, preferably if the measurement signal is significantly greater than that required for the initial notification of an error condition.

The user terminal 42 may indicate the error condition to the operator in any suitable manner, for example by way of a visual signal and/or an audible signal. Since each twine tensioner arrangement is monitored, the signal from the control unit 40 to the user terminal 42 can indicate which twine tensioner assembly 2 has caused the signal to be generated, thereby enabling the operator quickly to identify the location of the problem and so address the cause of the problem.

From reading the present disclosure, other modifications will be apparent to persons skilled in the art. Such modifications may involve other features which are already known in the field of square balers and component parts therefore and which may be used instead of or in addition to features already described herein.

The invention claimed is:

1. A combination comprising:
    an agricultural vehicle;
    a baler towed by the agricultural vehicle, wherein the baler comprises:
        a plurality of knotters, each knotter comprising a twine tensioner arrangement comprising a pair of rollers,
        wherein each roller is rotatable about a shaft and comprises circumferential lobes,
        wherein at least one of the shafts is displaceable, and
        a displacement measurement apparatus that generates displacement signals representative of the displacement of the shafts;
    a user terminal;
    a control unit; and
    memory in communication with the control unit, wherein the control unit is configured to receive a plurality of signals including the displacement signals from each twine tensioner arrangement, compare the displacement signals against a predetermined set of values stored in the memory to determine whether an error condition exists, and when the error condition exists, to generate and transmit a signal to the user terminal to generate an indication of the error condition.

2. The combination of claim 1, wherein when the displacement signal represents displacement of the shaft in excess of the predetermined value, the control unit generates a signal for operation of the baler to cease.

3. The combination of claim 1, in which the indication of the error condition generated by the user terminal may be visual, audible, or both visual and audible.

* * * * *